US006903342B2

(12) United States Patent
Chien

(10) Patent No.: US 6,903,342 B2
(45) Date of Patent: Jun. 7, 2005

(54) BANKNOTE ACCEPTOR

(75) Inventor: Tien-Yuan Chien, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 265 days.

(21) Appl. No.: 10/255,613

(22) Filed: Sep. 27, 2002

(65) Prior Publication Data

US 2003/0234361 A1 Dec. 25, 2003

(30) Foreign Application Priority Data

Jun. 21, 2002 (TW) .................................... 91113703 A

(51) Int. Cl.[7] .............................................. G01N 21/17

(52) U.S. Cl. ............................. 250/341.1; 250/341.8; 250/330; 250/271

(58) Field of Search ......................... 250/341.1, 341.8, 250/330, 271

(56) References Cited

U.S. PATENT DOCUMENTS 4,558,224 A * 12/1985 Gober ..................... 250/461.1
4,634,872 A * 1/1987 Janus et al. .............. 250/458.1
5,757,001 A * 5/1998 Burns ..................... 250/339.11
5,918,960 A * 7/1999 Hopwood et al. ............ 356/71
6,269,169 B1 * 7/2001 Funk et al. ................. 382/100
6,590,641 B2 * 7/2003 Yu .............................. 356/71
6,637,577 B2 * 10/2003 Ouyang et al. ............. 194/328
6,718,046 B2 * 4/2004 Reed et al. ................. 382/100
6,731,785 B1 * 5/2004 Mennie et al. .............. 382/135
6,766,045 B2 * 7/2004 Slepyan et al. ............. 382/135
2002/0173874 A1 * 11/2002 Lax ............................ 700/223
2003/0059098 A1 * 3/2003 Jones et al. ................. 382/135

* cited by examiner

*Primary Examiner*—Albert Gagliardi

(57) ABSTRACT

An infrared banknote acceptor for use to verify the authenticity of banknotes is constructed to include a housing, the housing having a base adapted to hold the banknote to be verified, a light source adapted to emit an infrared light beam onto the banknote carried on the base of the housing for verification, an image pickup adapted to receive infrared light reflected by the ink of the banknote carried on the base of the housing for verification and to convert received infrared light signal into video signal, and a display unit adapted to receive and display the video signal outputted from the image pickup.

6 Claims, 6 Drawing Sheets

BANKNOTE ACCEPTOR

BACKGROUND OF THE INVENTION

1. Field of the Invention

The present invention relates to a banknote acceptor and, more particularly to such a banknote acceptor, which uses infrared light to scan the image of the ink of the banknote to be verified, a charge-coupled device to pick up the scanned image, and a display unit to display the image picked up by the charge-coupled device for verification.

2. Description of the Related Art

Follow fast development of high-tech, some evil persons may use high technology equipment to do criminal affairs, for example, to counterfeit banknotes, securities, passports, etc. It is not easy to verify the authenticity of banknotes, securities, passports, etc. visually. Even an experienced person may make a wrong verification when checking the authenticity of a banknote, security, or passport visually. In order to help people verify the authenticity of banknotes or the like, various banknote acceptors have been disclosed, and have appeared on the market. However, these banknote acceptors commonly use ultraviolet ray to scan the banknote to be verified. During scanning, ambient visible light may interfere with the scanning of ultraviolet ray, affecting the verification result. Further, regular banknote acceptors are commonly designed to verity domestic banknotes only. These banknote acceptors may not be able to verify the authenticity of foreign banknotes, securities, passports, etc. accurately.

SUMMARY OF THE INVENTION

The present invention has been accomplished to provide an infrared banknote acceptor, which eliminates the aforesaid drawbacks. It is the main object of the present invention to provide an infrared banknote acceptor, which uses infrared light to scan the image of the ink of the banknote or the like to be verified, so as to achieve high verification accuracy. It is another object of the present invention to provide an infrared banknote acceptor, which is practical for verifying the authenticity of banknotes, securities, passports, etc. issued from different countries. To achieve these and other objects of the present invention, the infrared banknote acceptor comprises a housing, the housing having a base adapted to hold the banknote to be verified, a light source adapted to emit an infrared light beam onto the banknote carried on the base of the housing for verification, an image pickup adapted to receive infrared light reflected by the ink of the banknote carried on the base of the housing for verification and to convert received infrared light signal into video signal, and a display unit adapted to receive and display the video signal outputted from the image pickup.

DETAILED DESCRIPTION OF THE PREFERRED EMBODIMENT

Figure 1:
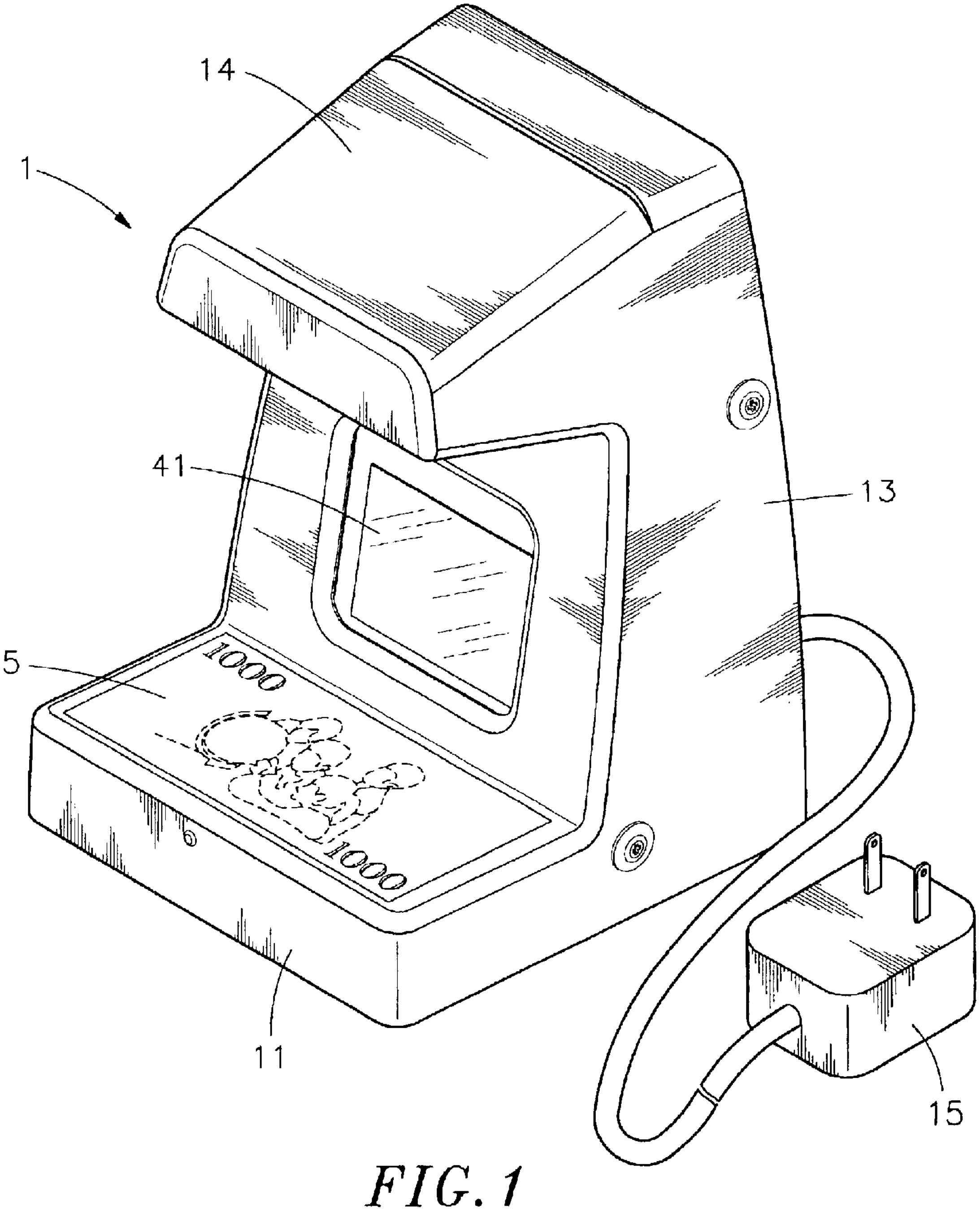
FIG. 1 is an elevational view of a banknote acceptor according to the present invention.
Figure 2:
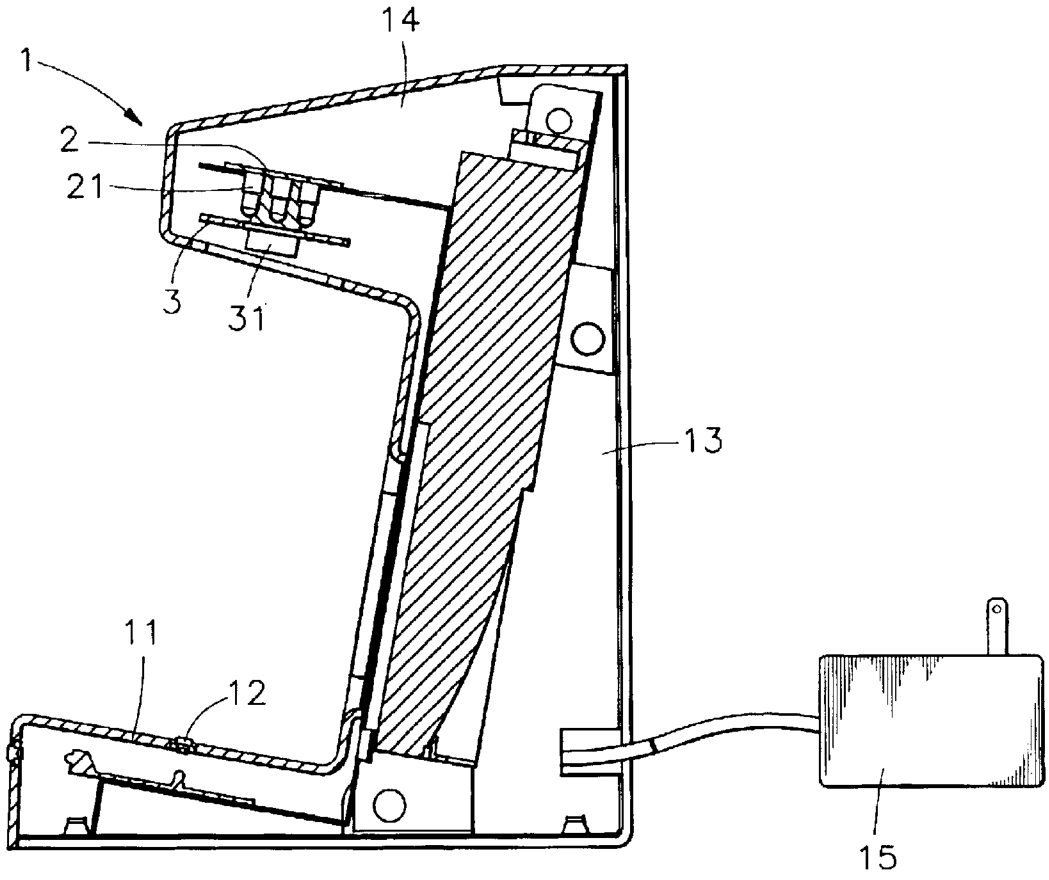
FIG. 2 is a side view in section of the banknote acceptor according to the present invention.
Figure 3:
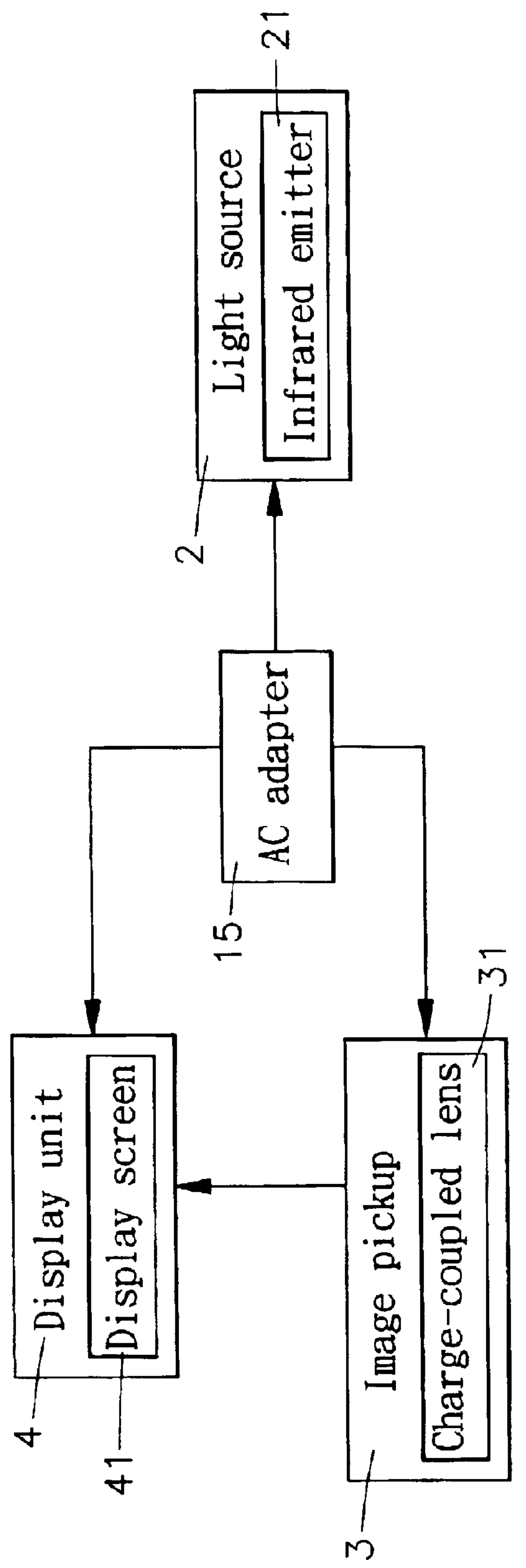
FIG. 3 is a circuit block diagram of the present invention.
Figure 4:
FIG. 4 shows the image of a banknote.
Figure 4A:
FIG. 4A shows the image of the banknote of FIG. 4 when scanned by the banknote acceptor according to the present invention.
Figure 5:
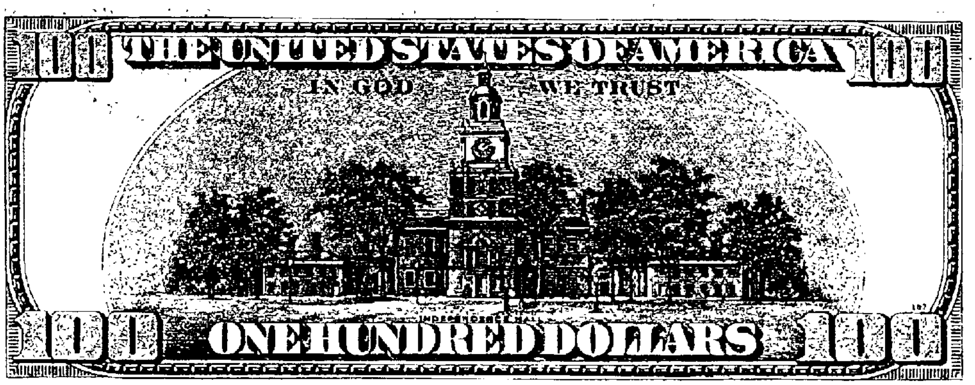
FIG. 5 shows the image of another banknote.
Figure 5A:
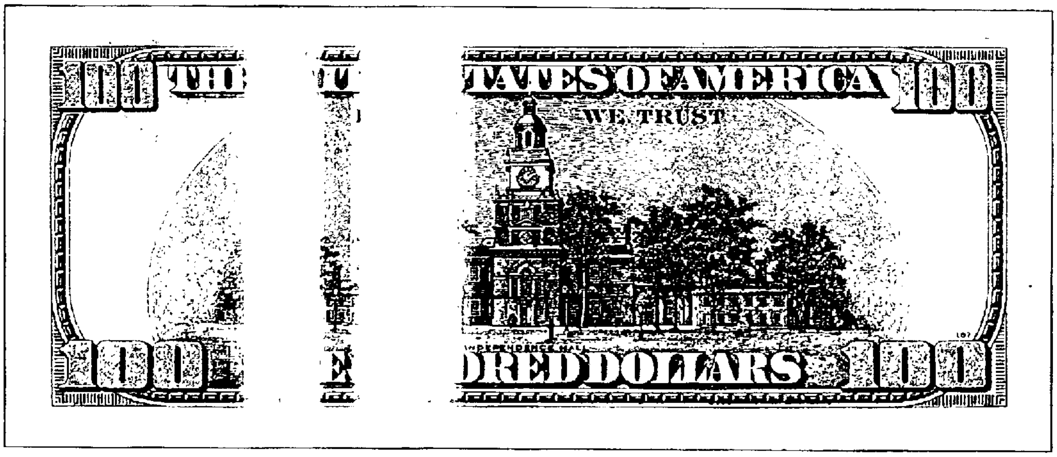
FIG. 5A shows the image of the banknote of FIG. 5 when scanned by the banknote acceptor according to the present invention.
Figure 6:
FIG. 6 shows the image of still another banknote.
Figure 6A:
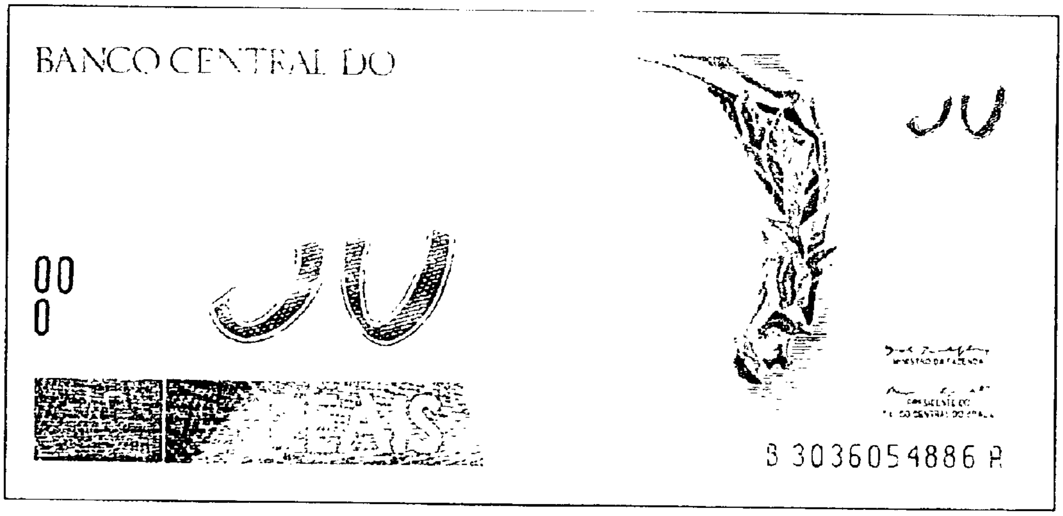
FIG. 6A shows the image of the banknote of FIG. 6 when scanned by the banknote acceptor according to the present invention.

Referring to FIGS. 1~3, a banknote acceptor is shown comprising a housing 1, a light source 2, an image pickup 3, a display unit 4. The light source 2, the image pickup 3, and the display unit 4 are respectively installed in the housing 1.

The housing 1 comprises a base 11 adapted to receive the banknote 5 to be verified, a power sensor 12 provided in the surface of the base 11, an upright back 13 located on the back side of the base 11, and a top 14 forwardly extended from the top side of the upright back 13 and spaced above the base 1 at a distance, and an AC adapter 15 extended out of the upright back 13 for connection to an electric outlet.

The light source 2 is provided inside the top 14 of the housing 1, comprising a downwardly extended infrared emitter 21 adapted to emit an infrared beam to the banknote 5 carried on the base 11.

The image pickup 3 is a charge-coupled device module installed in the top 14 of the housing 1, having a charge-coupled device 31 facing the base 11.

When the user put the banknote 5 to be verified on the base 11, the power sensor 12 is blocked and turned from "off" status to "on" status to start the light source 2 (the power sensor 12 is "on" when blocked from light, or "off" when receiving light), the image pickup 3, and the display unit 4. When stated, the infrared emitter 21 of the light source 2 emits an infrared beam onto the banknote 5, and the charge-coupled device 31 of the image pickup 3 picks up light reflected by the ink of the banknote 5 and converts the received image of light into a video signal, which is then transmitted to the display unit 4 and displayed on the display screen 41 for enabling the user to visually check the authenticity of the banknote 5.

FIGS. from 4 through 6A show an application of the present invention to verify the authenticity of different banknotes 5 issued from different countries. The ink of a banknote 5 may be composed of multiple ink components that absorb or reflect infrared light. The infrared light reflected by a particular banknote 5 shows a particular image. Therefore, the invention verifies the authenticity of the banknote 5 put on the base 11 of the infrared banknote acceptor automatically and accurately within a very short time.

According to the aforesaid embodiment, an AC adapter is provided for receiving city power supply. Alternatively, a rechargeable battery can be used to provide the infrared banknote acceptor with the necessary working voltage. Further, a manual on/off switch may be used instead of the aforesaid power sensor. Because the invention uses infrared light to scan the banknote to be verified, it is free from the interference of ambient visible light. Therefore, the invention achieves high accuracy in verifying the authenticity of banknotes.

A prototype of infrared banknote acceptor has been constructed with the features of the annexed drawings of FIGS. 1~3. The infrared banknote acceptor functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An infrared banknote acceptor adapted to verily the authenticity of banknotes, comprising:

a housing, said housing having a base adapted to hold the banknote to be verified;

a light source adapted to emit an infrared light beam onto the banknote carried an said base of said housing for verification;

an image pickup adapted to receive infrared light reflected by the ink of the banknote carried on said base of said housing for verification and to convert received infrared light signal into video signal; and a display unit adapted to receive and display the video signal outputted from said image pickup for visual verification and authentication thereof.

2. The infrared banknote acceptor as claimed in claim 1, wherein said base comprises a power adapter adapted to receive external power supply for said hight sourse, said image pickup, and said display unit.

3. The infrared banknote acceptor as claimed in claim 1, wherein said housing comprises a power sensor provided in said bese and adapted to turn on said hight source, said image pickup, and said display unit when the user put a banknote on said base for verification and to turn off said light source, said image pickup, and said display unit when the user removed the banknote from said base after verification.

4. The infrared banknote acceptor as claimed in claim 1, wherein said light source is comprised of an infrared emitter.

5. The infrared banknote acceptor as claimed in claim 1, wherein said image pickup is a charge-coupled device module comprising a charge-coupled device.

6. The infrared banknote acceptor as claimed in claim 1, wherein said display unit comprises a display screen for displaying the video signal outputted from said image pickup.

* * * * *